(12) United States Patent
Winger et al.

(10) Patent No.: US 9,026,842 B2
(45) Date of Patent: May 5, 2015

(54) SELECTIVE FAULT RECOVERY OF SUBSYSTEMS

(75) Inventors: Lyall Kenneth Winger, Waterloo (CA); Gregory Hall Ward, Gilroy, CA (US); Mark David Mesaros, Cambridge (CA)

(73) Assignee: BlackBerry Limited, Waterloo, Ontario (CA)

(*) Notice: Subject to any disclaimer, the term of this patent is extended or adjusted under 35 U.S.C. 154(b) by 454 days.

(21) Appl. No.: 13/424,476

(22) Filed: Mar. 20, 2012

(65) Prior Publication Data

US 2013/0254586 A1 Sep. 26, 2013

(51) Int. Cl.
G06F 11/00 (2006.01)
G06F 11/07 (2006.01)
G06F 11/14 (2006.01)

(52) U.S. Cl.
CPC ........ *G06F 11/0742* (2013.01); *G06F 11/0793* (2013.01); *G06F 11/1441* (2013.01)

(58) Field of Classification Search
None
See application file for complete search history.

(56) References Cited

U.S. PATENT DOCUMENTS

| | | | |
|---|---|---|---|
| 4,506,362 A | | 3/1985 | Morley |
| 5,251,227 A * | | 10/1993 | Bruckert et al. ................ 714/23 |
| 5,604,755 A * | | 2/1997 | Bertin et al. ................ 714/799 |
| 5,815,647 A | | 9/1998 | Buckland et al. |
| 6,147,967 A | | 11/2000 | Ying et al. |
| 6,330,689 B1 | | 12/2001 | Jin et al. |
| 6,367,022 B1 * | | 4/2002 | Gillespie et al. .............. 713/300 |
| 6,426,634 B1 | | 7/2002 | Clunn et al. |
| 6,448,671 B1 | | 9/2002 | Wallace et al. |
| 7,000,154 B1 | | 2/2006 | LeDuc et al. |
| 2002/0049923 A1 * | | 4/2002 | Kanazawa et al. ................ 714/5 |
| 2002/0152425 A1 * | | 10/2002 | Chaiken et al. ................ 714/23 |
| 2003/0135767 A1 * | | 7/2003 | Chu et al. ....................... 713/300 |
| 2003/0217146 A1 * | | 11/2003 | Srivastava et al. ............ 709/224 |
| 2004/0177242 A1 * | | 9/2004 | Erickson et al. .................. 713/2 |
| 2005/0289373 A1 * | | 12/2005 | Chapuis et al. ............... 713/300 |
| 2006/0209938 A1 | | 9/2006 | Chen |
| 2007/0240018 A1 * | | 10/2007 | Nalawadi et al. ............... 714/23 |
| 2008/0126855 A1 * | | 5/2008 | Higashijima et al. ........... 714/16 |
| 2008/0222408 A1 | | 9/2008 | Li |
| 2010/0184383 A1 | | 7/2010 | Lerke |
| 2011/0053649 A1 * | | 3/2011 | Wilson .......................... 455/566 |

FOREIGN PATENT DOCUMENTS

| | | |
|---|---|---|
| CA | 2807207 | 9/2013 |
| EP | 0191937 | 9/1989 |
| EP | 2362295 A1 | 8/2011 |
| EP | 2642390 A1 | 9/2013 |

OTHER PUBLICATIONS

European Patent Office, "Extended European Search Report" issued in European Patent Application No. 12160325.2, dated Jul. 2, 2012, 11 pages.

(Continued)

*Primary Examiner* — Gabriel Chu
(74) *Attorney, Agent, or Firm* — Fish & Richardson P.C.

(57) ABSTRACT

Various embodiments are described herein with regards to performing a selective fault recovery for an electronic device having a plurality of subsystems in which one of the subsystems has a fault. The selective fault recovery techniques described herein allow a user to use non-faulty subsystem of the electronic device while selective fault recovery is being conducted on the subsystem having the fault.

15 Claims, 5 Drawing Sheets

(56) References Cited

OTHER PUBLICATIONS

Response filed to Extended European Search Report corresponding to European Application No. 12160325.2—dated May 14, 2013, 20 pages.

Astraware Limited. Help & Support: What is the difference between a "soft" and "hard" reset? When should I use them? printed from http://www.astraware.com/support/showQuestion.php?id=111, retrieved on Apr. 15, 2014, 2 pages.

* cited by examiner

SELECTIVE FAULT RECOVERY OF SUBSYSTEMS

FIELD

The various embodiments described herein generally relate to an electronic device that employs components and associated methods for selective fault recovery.

BACKGROUND

Electronic devices that are in use today provide various functions. Accordingly, these devices utilize various components in order to provide the various functions. However, when a fault occurs with one of the components of an electronic device, the electronic device may undergo a full system shutdown. This results in a major interruption of a user who is performing an activity with the electronic device.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and in which.

DETAILED DESCRIPTION OF THE EMBODIMENTS

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein. It should also be noted that the term coupled indicates that two elements can be directly coupled to one another or coupled to one another through one or more intermediate elements.

The detailed description begins with a general description of an electronic device, in particular, a mobile device, and then proceeds to describe example embodiments of a portion of the mobile device as well as associated methods that can be used for selective fault recovery. Selective fault recovery, as described herein, provides a new approach for recovering from a fault in a subsystem of the mobile device in that various techniques are performed in order to recover the operation of the subsystem that has been discovered to have a fault. This is in contrast to conventional approaches in which an electronic device cannot recover when a subsystem has a fault and the electronic device simply freezes (e.g., remains on but becomes unresponsive), has a catastrophic failure (e.g., just shuts down), or undergoes an entire device reset in which the device shuts down and restarts, usually without input from the user of the device. Generally speaking, a fault can represent any failure or interruption or departure from normal operating conditions or tolerances caused by any reason. A fault may be due to a failure in hardware or software or both. A fault may, but need not, involve physical degradation or breakage of components or corruption of instructions or data. A fault may be caused in part by an intentional or inadvertent action of a user. A fault may be triggered by foreseeable or unforeseeable events. A fault may have an obvious cause, a cause determinable by some investigation or testing, or no readily discernable cause at all.

The selective fault recovery approaches described herein allow for an electronic device to continue operating even when a subsystem has been determined to have a fault. This allows the electronic device to attempt to recover the faulty subsystem (i.e., to get the subsystem with the fault operational again). This can be done using several different recovery techniques that may operate in the background (without notice to the user, perhaps with the user being unaware of them) thereby allowing the user to continue to use the electronic device as long as the faulty subsystem is not used until it is recovered. If none of the recovery techniques work, then the user may be presented with the option of powering off the faulty subsystem or resetting the entire electronic device. If the fault persists after the electronic device is reset, then the faulty subsystem can be powered down and the electronic device may continue to operate without the faulty subsystem. Accordingly, a user of the electronic device is provided with more options to recover from a fault as well as the ability to continue to use the electronic device without using the faulty subsystem until the faulty subsystem is recovered. The result is that the selective fault recovery only impacts the user's ability to use the faulty subsystem and the entire electronic device does not have to be powered down or shut down. In addition, in instances where the fault is power-related and could potentially create a thermal issue (colloquially, the device or a component of the device getting too hot), the faulty subsystem can be isolated and either recovered or turned off; in this way, contribution to the thermal issue by the subsystem in question may be reduced or eliminated entirely.

To aid the reader in understanding the structure of the mobile device, reference will be made to FIGS. 1 to 3. However, it should be understood that the embodiments described herein are not limited to a mobile device but can be extended to any electronic device that includes various subsystems that may encounter a fault during use, can be independently powered down and restarted, and can benefit from the selective fault recovery techniques described herein. It may be noted, however, that the concepts may be especially beneficial for mobile or portable electronic devices, which may be expected to be exposed to a greater variety of environments than generally stationary electronic devices, and may therefore be subjected to more conditions that may prompt such faults. It may be further noted that concerns such as thermal issues may have more significance when the electronic device is handheld, that is, sized and shaped to be held or carried in a human hand. Examples of such electronic devices generally include any portable electronic device with subsystems such as, but not limited to, cellular phones, cellular smart-phones, wireless organizers, personal digital assistants, computers, laptops, handheld wireless communication devices, wireless enabled notebook computers, tablet computers or e-readers, electronic security devices, wireless Internet appliances and the like. The electronic devices listed herein which are mobile are generally portable and thus are powered by a portable or self-contained power supply (such as a battery) and may have limited processing power. While some of these devices include wireless communication capability, others are standalone devices that do not communicate with other devices.

Figure 1:
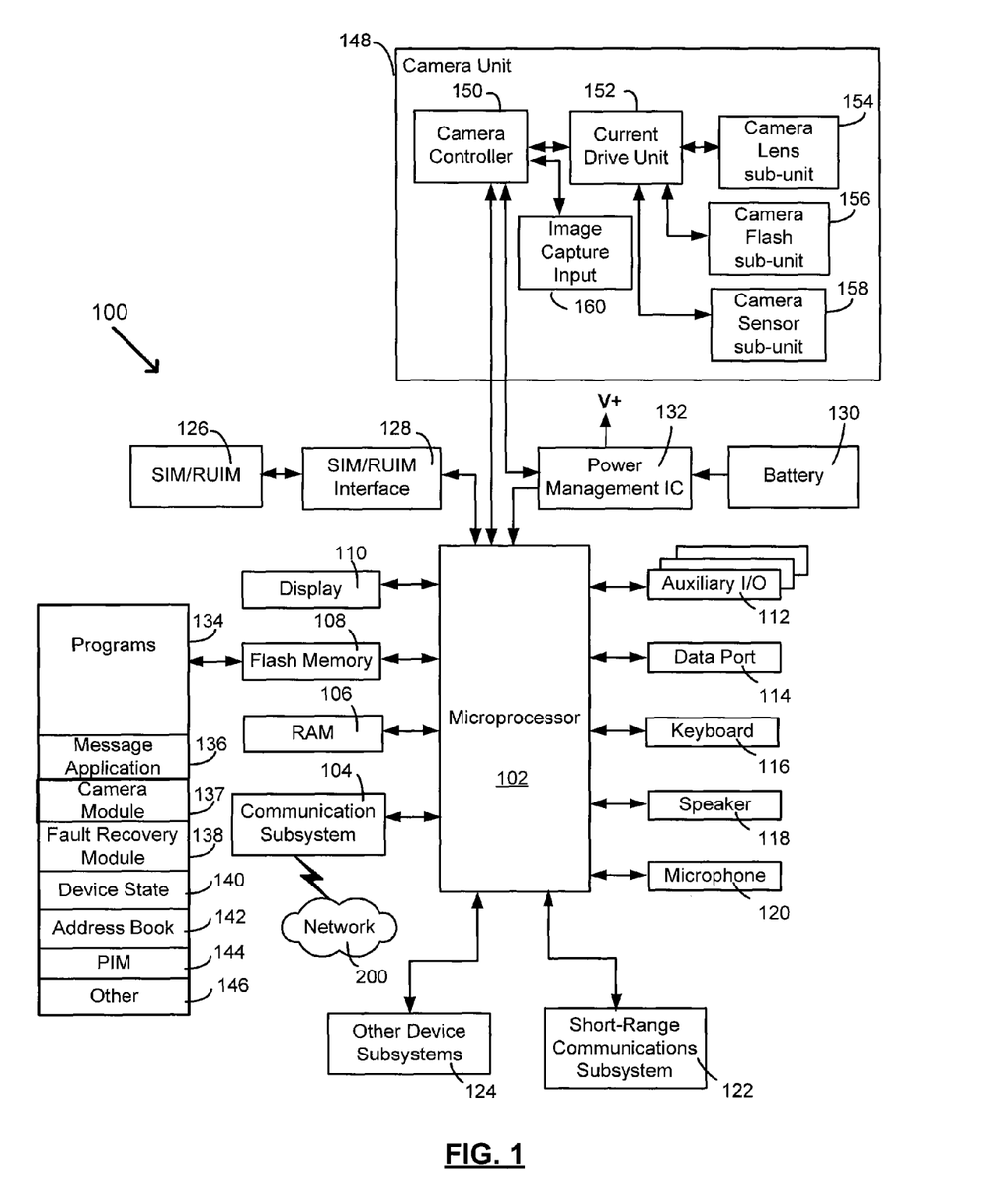
FIG. 1 is a block diagram of an example embodiment of a mobile device.

Referring now to FIG. 1, shown therein is a block diagram of one example of a mobile device 100 which is an example of an electronic device that can use the selective fault recovery techniques described herein. The mobile device 100 comprises a number of components. The components may be physically coupled to or inside a case or housing (not shown). Some of these components may be part of one or more subsystems of the mobile device 100, or may be subsystems in and of themselves. The controlling component is a microprocessor 102, which controls the overall operation of the mobile device 100. For simplicity, a single microprocessor 102 is shown, although the concepts described herein may be performed using one or more processors. Communication functions, including data and voice communications, are performed through a communication subsystem 104. The communication subsystem 104 receives messages from and sends messages to a wireless network 200. In this example, the communication subsystem 104 is configured in accordance with the Global System for Mobile Communication (GSM) and General Packet Radio Services (GPRS) standards. In other embodiments, the communication subsystem 104 can be configured in accordance with other communication standards as described below. New standards are still being defined, but it is believed that they will have similarities to the network behaviour described herein, and it will also be understood by persons skilled in the art that the various embodiments described herein should be able to be adapted to work with any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit-switched voice communications and packet-switched data communications.

Although the wireless network 200 associated with the mobile device 100 is a GSM/GPRS wireless network in this example, the mobile device 100 can be adapted to use other wireless networks in variant embodiments. For example, the different types of wireless networks that can be employed include, but are not limited to, data-centric wireless networks, voice-centric wireless networks, and dual-mode networks that can support both voice and data communications over the same physical base stations. Examples of networks also include, but are not limited to, Code Division Multiple Access (CDMA), CDMA2000 networks, GSM/GPRS networks, 3G networks like EDGE, W-CDMA and UMTS, 4G/LTE networks and future technologies such as 5G networks. Some other examples of data-centric networks include WiFi 802.11, Mobitex™ and DataTAC™ network communication systems. Examples of voice-centric data networks include Personal Communication Systems (PCS) networks like GSM and Time Division Multiple Access (TDMA) systems. Examples of communication protocols/standards that the mobile device 100 can be adapted to be used with include, but are not limited to, 3GPP and 3GPP2, High-Speed Packet Access (HSPA) standards such as High-Speed Downlink Packet Access (HSDPA), 3GPP LTE, LTE, LTE Advanced, WiMax, and Flash-OFDM.

The microprocessor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications subsystem 122 and other device subsystems 124. It should be noted that the subsystems 122 and 124 are examples of only a few subsystems of the mobile device 100 and there are many other subsystems as described in more detail below.

Some of the subsystems of the mobile device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list. Operating system software used by the microprocessor 102 is typically stored in a persistent store such as the flash memory 108, which can alternatively be a read-only memory (ROM) or similar storage element (not shown). Those skilled in the art will appreciate that the operating system, specific device applications, or parts thereof, can be temporarily loaded into a volatile store such as the RAM 106.

The mobile device 100 can send and receive communication signals over the wireless network 200 after network registration or activation procedures have been completed. Network access is associated with a subscriber or user of the mobile device 100. To identify a subscriber, the mobile device 100 may use a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services can include: web browsing and messaging such as e-mail, voice mail, SMS, and MMS. More advanced services can include: point of sale, field service and sales force automation. The SIM card/RUIM 126 includes a processor and memory for storing information. Once the SIM card/RUIM 126 is inserted into the SIM/RUIM interface 128, it is coupled to the microprocessor 102. In order to identify the subscriber, the SIM card/RUIM 126 contains some user parameters such as an International Mobile Subscriber Identity (IMSI). An advantage of using the SIM card/RUIM 126 is that a subscriber is not necessarily bound by any single physical mobile device. The SIM card/RUIM 126 can store additional subscriber information for a mobile device as well, including datebook (or calendar) information and recent call information. Alternatively, user identification information can also be programmed into the flash memory 108.

The mobile device 100 has a portable power supply, and, in the example of FIG. 1, the mobile device 100 is a battery-powered device that uses one or more rechargeable batteries in a battery unit 130. The battery unit 130 can also be a smart battery. Smart batteries generally include a battery processor, battery memory, switching and protection circuitry, measurement circuitry and a battery pack that includes one or more batteries, which are generally rechargeable. In either case, the one or more batteries in the battery unit 130 can be made from lithium, nickel-cadmium, lithium-ion, or other suitable composite material.

The mobile device 100 also includes a Power Management Integrated Circuit (PMIC) 132 which includes a micro-controller and provides power management services for various components of the mobile device 100. The power management services typically include battery management, voltage regulation and charging functions. Accordingly, the PMIC 132 typically includes a converter such as, but not limited to, a DC to DC converter or a buck converter. The PMIC 132 can use an I²C or SPI serial bus communication interface, for example, to communicate with various components of the mobile device 100. The PMIC 132 can also include a voltage regulator, or be coupled to a voltage regulator (not shown), to provide power V+ to various components of the mobile device 100. The PMIC 132 also includes firmware for interaction with various components of the mobile device 100. In some embodiments, the firmware of the PMIC 132 can include algorithms and logic to implement at least a portion of the functionality of the fault recovery module 138. Other components or configurations can also be used for the PMIC 132 as is known by those skilled in the art.

In some embodiments, the PMIC 132 includes current sensors to measure current that is drawn by at least some of the subsystems of the mobile device 100. In some embodiments, the PMIC 132 can also include an analog to digital converter that is coupled to at least one temperature sensor that is external to the PMIC 132 to measure the temperature of at least some of the subsystems of the mobile device 100. In alternative embodiments, at least some of the subsystems of the mobile device 100 include current sensors to perform current measurement. In alternative embodiments, at least some of the subsystems of the mobile device 100 include temperature sensors to perform temperature measurement. In either of these cases, the current measurement or temperature measurement or both the current and temperature measurements are then conveyed to the microprocessor 102 or the PMIC 132 or both the microprocessor 102 and the PMIC 132 for further processing to implement various methods such as selective fault recovery. Furthermore, in these alternative embodiments, if each subsystem performs its own temperature and current measurement, the temperature and current sensors are not required in the PMIC 132. Accordingly, in these various embodiments, there can be an array of temperature sensors or an array of current sensors or an array of temperature sensors and an array of current sensors that are placed in various parts of the mobile device 100 to get a reading of board temperatures or drawn current or both temperature and drawn current for each of the defined subsystems.

Such sensors may represent one way by which a fault resulting in a thermal issue may be detected, as well as the location where the thermal issue may be more of concern. Such sensors may be used to detect the presence of a thermal issue (and a possible fault) in the first place, as well as to identify likely causes or sources of the thermal issue. In embodiments that use temperature sensors, for example, temperature measurements may be obtained for the various subsystems to determine if any of them have a fault. In embodiments that use current sensors, measurements may be obtained for the current drawn by the various subsystems to determine if any of them have a fault. In embodiments that use both current sensors and temperature sensors, both temperature and current measurements can be performed to verify that there is a fault in a subsystem in case one of the types of sensors is damaged or provides an incorrect reading. For example, temperature measurements can first be performed on the various subsystems to determine if any of them have a fault. Current measurements can then be performed for any subsystems identified to have a fault to verify that the identified subsystems actually do have a fault. Alternatively, in embodiments that use both current sensors and temperature sensors, current measurements can first be performed on the various subsystems to determine if any of them have a fault. Temperature measurements can then be performed for any subsystems identified to have a fault to verify that the identified subsystems actually do have a fault. Temperature measurements are compared to temperature thresholds for the various subsystems to determine if there is a fault. Likewise, current measurements are compared to current thresholds for the various subsystems to determine if there is a fault. The various subsystems may have different temperature thresholds that indicate a fault. Likewise, the various subsystems may have different current thresholds that indicate a fault. As the above discussion illustrates, the existence of a fault, diagnosis of the fault's possible location and determination of the fault's likely cause or causes may be achieved by active or passive detection of any departure from normal operating conditions by any procedure. Fault detection for other subsystems need not involve temperature or current sensors, but may involve one or more sensors or signals or tests.

The microprocessor 102, in addition to its operating system functions, enables execution of software applications 134 on the mobile device 100. The subset of software applications 134 that control basic device operations, including data and voice communication applications, will normally be installed on the mobile device 100 during its manufacture. When the microprocessor 102 is executing any of the software applications 134, the microprocessor 102 can be considered to be configured to execute a number of steps according to the methods specified by the code of the software applications 134.

The software applications 134 include a message application 136 that can be any suitable software program that allows a user of the mobile device 100 to send and receive electronic messages. Various alternatives exist for the message application 136 as is well known to those skilled in the art. Messages that have been sent or received by the user are typically stored in the flash memory 108 of the mobile device 100 or some other suitable storage element in the mobile device 100. In an alternative embodiment, some of the sent and received messages can be stored remotely from the device 100 such as in a data store of an associated host system that the mobile device 100 communicates with. For instance, in some cases, only recent messages can be stored within the device 100 while the older messages can be stored in a remote location such as the data store associated with a message server. This can occur when the internal memory of the device 100 is full or when messages have reached a certain "age", i.e. messages older than 3 months can be stored at a remote location. In an alternative embodiment, all messages can be stored in a remote location while only recent messages can be stored on the mobile device 100.

The mobile device 100 further includes a camera module 137, a fault recovery module 138, a device state module 140, an address book 142, a Personal Information Manager (PIM) 144, and other modules 146. The camera module 137 is used to control the camera operation for the mobile device 100.

The fault recovery module 138 is used to determine if one of the subsystems of the mobile device 100 encounters a fault and then applies various fault recovery techniques to remove the fault and regain the functionality of the no longer faulty subsystem. The operation of the fault recovery module 138 is discussed in further detail below. Although represented in FIG. 1 as a software application, the fault recovery module 138 may be embodied as any combination of hardware, software or firmware.

The device state module 140 provides persistence, i.e. the device state module 140 ensures that important device data is stored in persistent memory, such as the flash memory 108, so that the data is not lost when the mobile device 100 is turned off or loses power. The address book 142 provides information for a list of contacts for the user. For a given contact in the address book 142, the information can include the name, phone number, work address and email address of the contact, among other information. The other modules 146 can include a configuration module (not shown) as well as other modules that can be used in conjunction with the SIM/RUIM interface 128.

The PIM 144 has functionality for organizing and managing data items of interest to a subscriber, such as, but not limited to, e-mail, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Additional applications can also be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and can provide enhanced on-device functions, communication-related functions, or both. For example, secure communication applications can enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path can, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the mobile device 100.

The short-range communications subsystem 122 provides for communication between the mobile device 100 and different systems or devices, without the use of the wireless network 200. For example, the subsystem 122 can include an infrared device and associated circuits and components for short-range communication. Examples of short-range communication include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the microprocessor 102. The microprocessor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as a touch screen, mouse, track ball, infrared fingerprint detector, or a roller wheel with dynamic button pressing capability. The keyboard 116 is preferably an alphanumeric keyboard and/or telephone-type keypad. However, other types of keyboards can also be used. A composed item can be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

The mobile device 100 also includes a camera unit 148 that allows a user of the mobile device 100 to take pictures. The camera unit 148 includes a camera controller 150, a current drive unit 152, a camera lens sub-unit 154, a camera flash sub-unit 156, a camera sensor sub-unit 158 and an image capture input 160. The camera controller 150 configures the operation of the camera unit 148 in conjunction with information and instructions received from the microprocessor 102 and the camera module 137. It should be noted that the structure shown for the camera unit 148 and the associated description is only one example embodiment and that the technique of obtaining camera images for viewing on the display 110 should not be limited to this example embodiment.

The camera controller 150 receives an activation signal from the microprocessor 102 when a user selects the camera mode for the mobile device 100. The camera unit 148 then determines the maximum camera flash current that can be drawn from the battery unit 130 as well as the magnitude of light that needs to be produced by the camera flash for the current physical surroundings of the mobile device 100 so that a good quality picture is taken of the scene; in this regard various techniques known to those skilled in the art can be employed. For example, current pulses of varying lengths may be used to generate the camera flash. Alternatively, a constant pulse length can be used along with a maximum amplitude setting and other elements can be varied, such as the aperture of the lens, to have the intended effect of a camera flash having a different light output.

The camera controller 150 then instructs the current drive unit 152 to generate the camera flash current that is used by the camera flash sub-unit 156 without drawing more than the maximum camera flash current that is allowable from the battery unit 130. The camera controller 150 also configures the current drive unit 152 to generate the current that is used to actuate the camera lens sub-unit 154. The current drive unit 152 may be a linear regulator in which the input current to the linear regulator and the output current of the linear regulator are equal. Alternatively, the current drive unit 152 can be a combination of a boost and a linear regulator, in order to provide an increased amount of current to the camera flash sub-unit 158 compared to the current obtained from the battery unit 130 when needed. Alternatively, the current drive unit 152 can be a combination of a buck and a linear regulator that can be used if the camera flash voltage is always less than the battery unit voltage. Alternatively, both a buck and a boost circuit can be used with a linear regulator for the current drive unit 152.

Depending on the particular configuration that is employed, the camera lens sub-unit 154 includes a lens along with a shutter and/or aperture along with components to open and close the shutter and/or aperture. Alternatively, the camera lens sub-unit 154 can include components that provide telescopic functionality to allow the user to take a "zoomed-in" or "zoomed-out" picture. In other alternatives, the camera lens sub-unit 154 can include all of these components. The structure used for each of these alternatives is known to those skilled in the art.

The camera flash sub-unit 156 includes a camera flash to generate light having an appropriate magnitude or lumen to increase the quality of the images that are obtained by the camera unit 148. However, the output of the camera flash sub-unit 156 is limited due to the limit on the current that can be drawn from the battery unit 130 for flash purposes (the limit is specified by the maximum camera flash current). The camera flash sub-unit 156 is typically based on LED flash technology. In alternative embodiments, other types of appropriate flashes can be used.

The camera sensor sub-unit 158 captures image data and sends the image data to the camera controller 150. The camera sensor sub-unit 158 also uses current for operation and receives this current from the current drive unit 152. The camera sensor sub-unit 158 can be based on CMOS sensor technology, CCD sensor technology and the like as is commonly known by those skilled in the art. The camera controller 150 converts the image data into a desired format such as JPEG image data and produces a raw thumbnail image data corresponding to the JPEG image data. The camera controller 150 then combines both the JPEG image data and the raw thumbnail image data to form image data which is then stored in a memory element of the mobile device 100, such as the RAM 106.

Typically, the image capture input 160 is a push-button actuator which is depressed by the user when the user wants to take a picture. In alternative embodiments, the image capture input 160 can be a switch or some other appropriate input mechanism as known by those skilled in the art.

Figure 2:
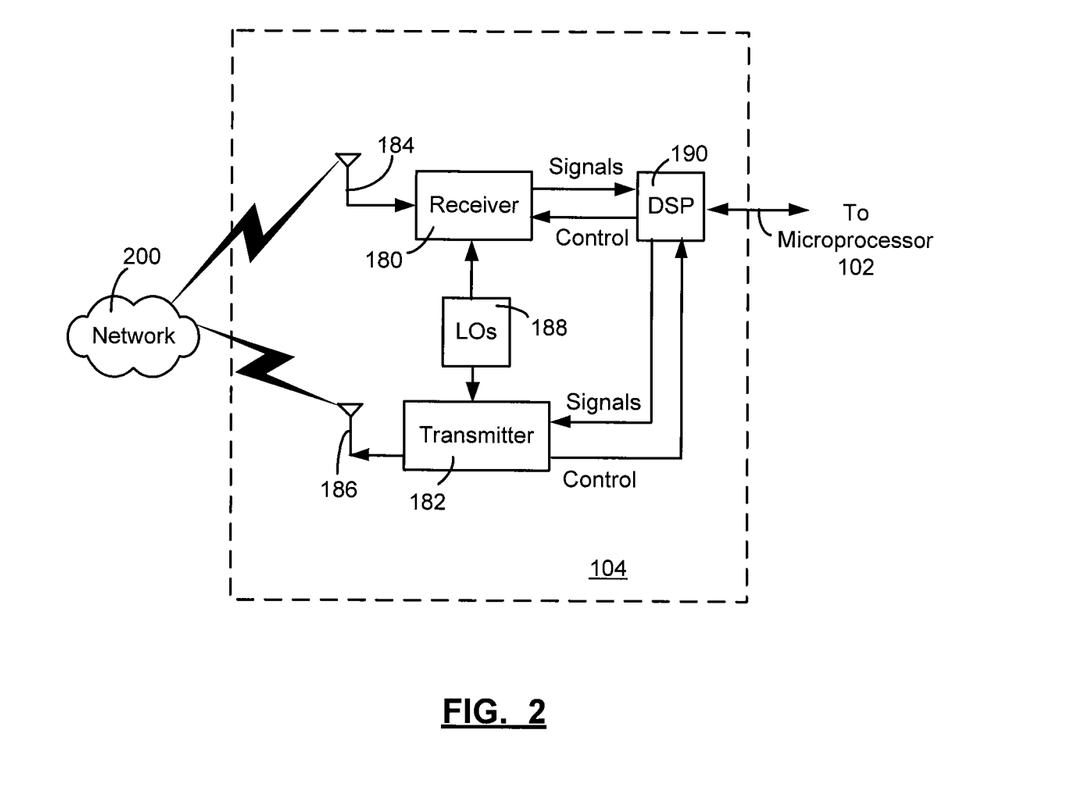
FIG. 2 is a block diagram of an example embodiment of a communication subsystem component of the mobile device of FIG. 1.

Referring now to FIG. 2, a block diagram of the communication subsystem component 104 of FIG. 1 is shown. Communication subsystem 104 comprises a receiver 180, a transmitter 182, one or more embedded or internal antenna elements 184 and 186, Local Oscillators (LOs) 188, and a processing module such as a Digital Signal Processor (DSP) 190.

The particular design of the communication subsystem 104 is dependent upon the network 200 in which the mobile device 100 is intended to operate; thus, it should be understood that the design illustrated in FIG. 2 serves only as one example. Signals received by the antenna 184 through the network 200 are input to the receiver 180, which may perform such common receiver functions as signal amplification, frequency down conversion, filtering, channel selection, and analog-to-digital (A/D) conversion. A/D conversion of a received signal allows more complex communication techniques such as demodulation and decoding to be performed in the DSP 190. In a similar manner, signals to be transmitted are processed, including modulation and encoding, by the DSP 190. These DSP-processed signals are input to the transmitter 182 for digital-to-analog (D/A) conversion, frequency up conversion, filtering, amplification and transmission over the network 200 via the antenna 186. The DSP 190 not only processes communication signals, but also provides for receiver and transmitter control. For example, the gains applied to communication signals in the receiver 180 and the transmitter 182 may be adaptively controlled through automatic gain control algorithms implemented in the DSP 190.

The wireless link between the mobile device 100 and a network 200 may contain one or more different channels, typically different RF channels, and associated protocols used between the mobile device 100 and the network 200. An RF channel is a limited resource that must be conserved, typically due to limits in overall bandwidth and limited battery power of the mobile device 100.

When the mobile device 100 is fully operational, the transmitter 182 is typically keyed or turned on only when it is sending to the network 200 and is otherwise turned off to conserve resources. Similarly, the receiver 180 is periodically turned off to conserve power until it is needed to receive signals or information (if at all) during designated time periods.

Figure 3:
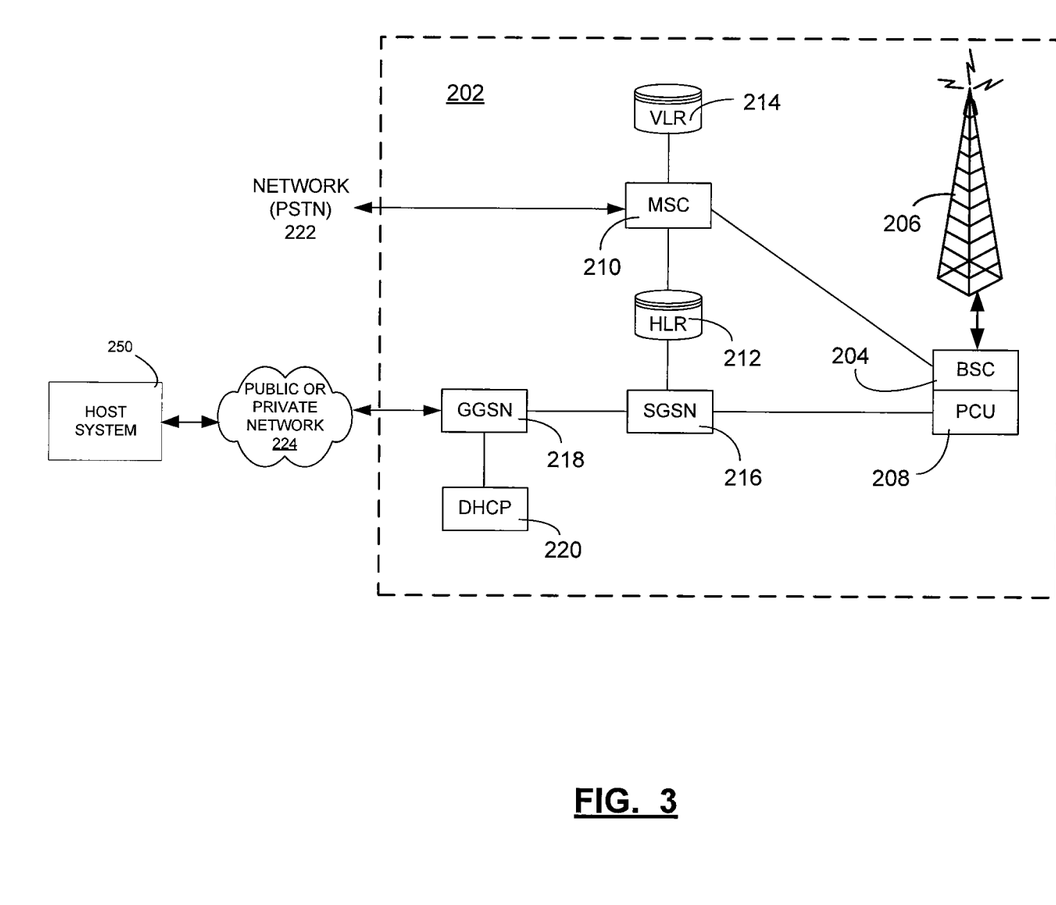
FIG. 3 is a block diagram of a node of a wireless network in one example embodiment.

Referring now to FIG. 3, a block diagram of a node of a wireless network is shown as 202. In this example embodiment, the network and its components are described for operation with General Packet Radio Service (GPRS) and Global Systems for Mobile (GSM) technologies. However, it should be understood that in other embodiments the network can be implemented in accordance with other communication protocols. In practice, the network 200 comprises one or more nodes 202. The mobile device 100 communicates with a node 202 within the wireless network 200. The node 202 is configured in accordance with GPRS and GSM technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to the public or private network (Internet) 224 (also referred to herein generally as a shared network infrastructure) represents the data path for GPRS capable mobile devices. In a GSM network extended with GPRS capabilities, the BSC 204 also contains a Packet Control Unit (PCU) 208 that connects to the SGSN 216 to control segmentation, radio channel allocation and to satisfy packet switched requirements. To track mobile device location and availability for both circuit switched and packet switched management, the HLR 212 is shared between the MSC 210 and the SGSN 216. Access to the VLR 214 is controlled by the MSC 210.

The station 206 may be a fixed transceiver station in which case the station 206 and the BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from the mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further the VLR 214 also contains information on mobile devices that are visiting other networks. The information in the VLR 214 includes part of the permanent mobile device data transmitted from the HLR 212 to the VLR 214 for faster access. By moving additional information from a remote node of the HLR 212 to the VLR 214, the amount of traffic between these nodes can be reduced so that voice and data services can be provided with faster response times while at the same time using less computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each mobile device 100. The SGSN 216 also performs security functions and access control for data traffic on the network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, GPRS capable networks use private, dynamically assigned IP addresses and thus use a DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a mobile device 100, through the PCU 208 and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile device 100 must be assigned to one or more APNs and the mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile device 100 is not using its PDP Context, the PDP Context can be deallocated and the IP address returned to the IP address pool managed by the DHCP server 220.

The host system 250 may be a corporate enterprise or other local area network (LAN), but may also be a home office computer or some other private system, for example, in variant embodiments. In some cases, the host system 250 may represent a smaller part of a larger network of an organization. Typically, mobile devices communicate wirelessly with the host system 250 through one or more of the nodes 202 of the wireless network 200. The host system 250 may include one or more routers and computing devices that may operate from behind a firewall or proxy server. The proxy server routes data to the correct destination server(s) within the host system 250. For instance, the host system 250 may include a message server to send and receive messages to the mobile devices and a message management server that controls when, if, and how messages are sent to the mobile devices. The host system 250 can also include other servers that provide various functions for the host system 250 as well as data stores or databases.

Figure 4:
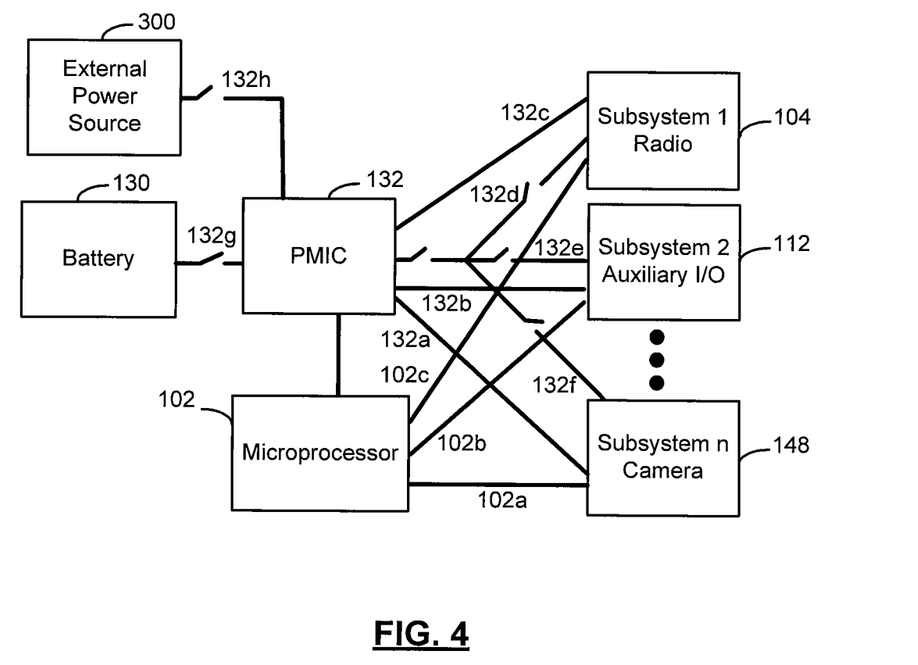
FIG. 4 is a block diagram of an example embodiment of a portion of the mobile device that performs selective fault recovery.

Referring now to FIG. 4, shown therein is a block diagram of an example embodiment of a portion of the mobile device 100 that performs selective fault recovery. In this example, the microprocessor 102 and the PMIC 132 are both used to perform the selective fault recovery techniques described herein. Accordingly, the microprocessor 102 and the PMIC 132 are coupled to various subsystems of the mobile device 100 that may encounter a fault. The use of both the microprocessor 102 and the PMIC 132 provides a more robust design since if one of these elements becomes non-operational, the other element can still be used to perform some part of fault recovery.

In an alternative embodiment, one of the microprocessor 102 and the PMIC 132 can be used to perform fault recovery. In another alternative embodiment, a discrete hardware system with appropriate firmware can implement the selective fault recovery techniques described herein. In this case, the dedicated hardware system includes a single processor and possibly one or more sensors such as temperature sensors or current measurement sensors or both temperature sensors and current sensors if these components are not included in the subsystems that the dedicated hardware system is monitoring for faults. It should be understood that there are current sensors or temperature sensors or current and temperature sensors (not shown for ease of illustration) which may be in the PMIC 132 or the subsystems 104, 112 and 148 or distributed near the subsystems 104, 112 and 148. When current sensors are used, there is generally a current sensor for each power switch.

For ease of illustration, the fault recovery techniques described herein are implemented using the combination of the microprocessor 102 and the PMIC 132. However, in alternative embodiments in which one processor is used to implement fault recovery, the processor will perform the functions described below for the microprocessor 102 and the PMIC 132 and will be coupled to the various subsystems via reset lines, power switches and sensors having at least one sensor type where the sensor type can be current sensors or temperature sensors or both current and temperature sensors.

Several example subsystems are shown in FIG. 4 such as the radio subsystem 104, the auxiliary I/O subsystem 112 and the camera subsystem 148. For ease of illustration, only the operation with the subsystems 104, 112 and 148 will be discussed. However, it should be understood that the operations described herein can be extended to the other subsystems of the mobile device 100. For example, there can be many other subsystems such as, but not limited to, the short-range communications subsystem 122, an audio subsystem, a display subsystem, device subsystems 124, internal memory subsystems and external memory subsystems. Each of these subsystems can include various components. For example, the short-range communications subsystem 122 can include at least one of a Wireless Local Area Network (WLAN) module, a Global Positioning System (GPS) module, a Blue-Tooth (BT) module and a Near Field Communication (NFC) module. The audio subsystem can include the speaker 118 and the microphone 120. The display subsystem can include at least one of the display 110 and a touch panel, as well as a backlight driver. The auxiliary I/O subsystem 112 can include at least one of a track pad and a keyboard. The device subsystems 124 can include sensors such as at least one of a gyroscope, a magnetometer, and an accelerometer. The internal memory subsystem can include the flash memory 108 and the RAM 106.

The microprocessor 102 is coupled to the subsystems 104, 112 and 148 through reset lines 102*a*, 102*b* and 102*c*. The PMIC 132 is coupled to the subsystems 104, 112 and 148 through reset lines 132*a*, 132*b* and 132*c* and power switches 132*d*, 132*e* and 132*f*, respectively. The PMIC 132 is also coupled to the battery unit 130 through a power switch 132*g* and to an external power source 300 through a power switch 132*h*. The external power source 300 is any power source that is external to the mobile device 100 which can be suitable for providing power to the mobile device 100. For example, the external power source 300 can be a charging device or the power source of a computing device which is connected to the mobile device 100 by a USB connection. Accordingly, the external power source 300 may not always be present.

The reset lines 102*a* to 102*c* and 132*a* to 132*c* do not remove power to the subsystems to which they are coupled but are used to provide a state reset to these subsystems. Accordingly, in a state reset, the power to a subsystem is maintained, however, certain components may be electronically set to a particular starting state. For example, any registers or values associated with the subsystem may be reset so that the subsystem returns to the initial state that it had when it was first powered up. The microprocessor 102 and the PMIC 132 are both capable of initiating a state reset on a subsystem or the entire device itself (i.e. a state reset of the system, or every subsystem in the device). The power switches 132*d*, 132*e*, 132*f*, 132*g* and 132*h* are used to provide a power reset to the subsystems to which they are connected and therefore are used to disconnect power down (i.e. disable power) and power up (i.e. enable power) to the subsystems to which they are connected. Accordingly, in a power reset, by disabling and then re-enabling the power to a subsystem, the subsystem also returns to its initial state. A power reset is considered to be more effective in resetting a given subsystem since there may be some influences from other subsystems that can only be cleared from the given subsystem by performing a power reset.

The microprocessor 102 is responsible for detecting non-communicating subsystems, which may be due to a software fault. The microprocessor 102 also implements and provides a user interface to a user of the mobile device 100 in order to provide information about faults and fault recovery as well as receive commands from the user to perform some aspects of fault recovery (such as initiating a state reset of the system, which is described in more detail below). The reset lines 102*a*, 102*b*, and 102*c* allow the microprocessor 102 to perform a state reset on the subsystems 148, 112 and 104, respectively, when a fault is detected in one of them. Detecting a fault in a subsystem generally entails detecting which subsystem (or subsystems) is in some way encountering or affected by a fault. Detecting a fault in a subsystem may, but does not in every case, include detecting the source(s) or cause(s) of the fault. In some cases, the microprocessor 102 can provide state reset and power reset commands through the reset lines depending on the particulars of the subsystems to which the microprocessor 102 is connected. For example, some subsystems have specific reset lines while other subsystems may use a certain power rail for reset or require their I$^2$C lines to be pulled low.

The PMIC 132 is configured to detect which subsystem encounters a fault by monitoring the temperature of the subsystems or the current drawn by the subsystems or both the temperature of the subsystems and the current drawn by the subsystems for faults related to thermal issues (which may referred to a thermal faults), as described with respect to FIG. 1. When the PMIC 132 detects a thermal or power fault, the PMIC 132 informs the microprocessor 102 of a subsystem fault and whether it is a thermal or power fault. The microprocessor 102 will then instruct the PMIC 132 to power down the subsystem that may be responsible for the fault. However, if the microprocessor 102 is unresponsive, then the PMIC 132 can power down the faulty subsystem on its own. Accordingly, in this example embodiment, the PMIC 132 is configured to control the power reset of the faulty subsystem or the overall device system according to the selective fault recovery techniques described herein. The reset lines 132*a*, 132*b* and 132*c* allow the PMIC 132 to perform a state reset on the subsystems 148, 112 and 104, respectively, when a fault is detected in one of them, while the power switches 132*d*, 132*e* and 132*f* allow the PMIC 132 to perform a power reset of the subsystems 148, 112 and 104.

The PMIC 132 and the microprocessor 102 have the ability to perform different types of resets. The microprocessor 102 can perform a state reset on a subsystem to which the microprocessor 102 is coupled. The microprocessor 102 can also perform a state reset for the entire system (i.e. the whole mobile device 100). The microprocessor 102 can inform the PMIC 132 that it has initiated a state reset. A power reset of the whole system can also be performed. In this case, the microprocessor 102 typically instructs the PMIC 132, via an I2C communication line for example, to complete the power reset which effectively removes all power to the system except for the power to the microcontroller inside the PMIC 132, which is the only subsystem that remains active in order to power-up the system. Likewise, in other embodiments that do not use the PMIC 132, there will always be a mini-subsystem/hardware circuit that will never be disconnected from power during a power reset so that it can power-up the system after a power reset. During a power reset, there is no communication to the battery unit 130, and all of the power switches and power cycles are controlled by the PMIC 132. In addition, in situations in which the microprocessor 102 is unresponsive, the PMIC 132 can perform a power reset of the system on its own.

Figure 5:
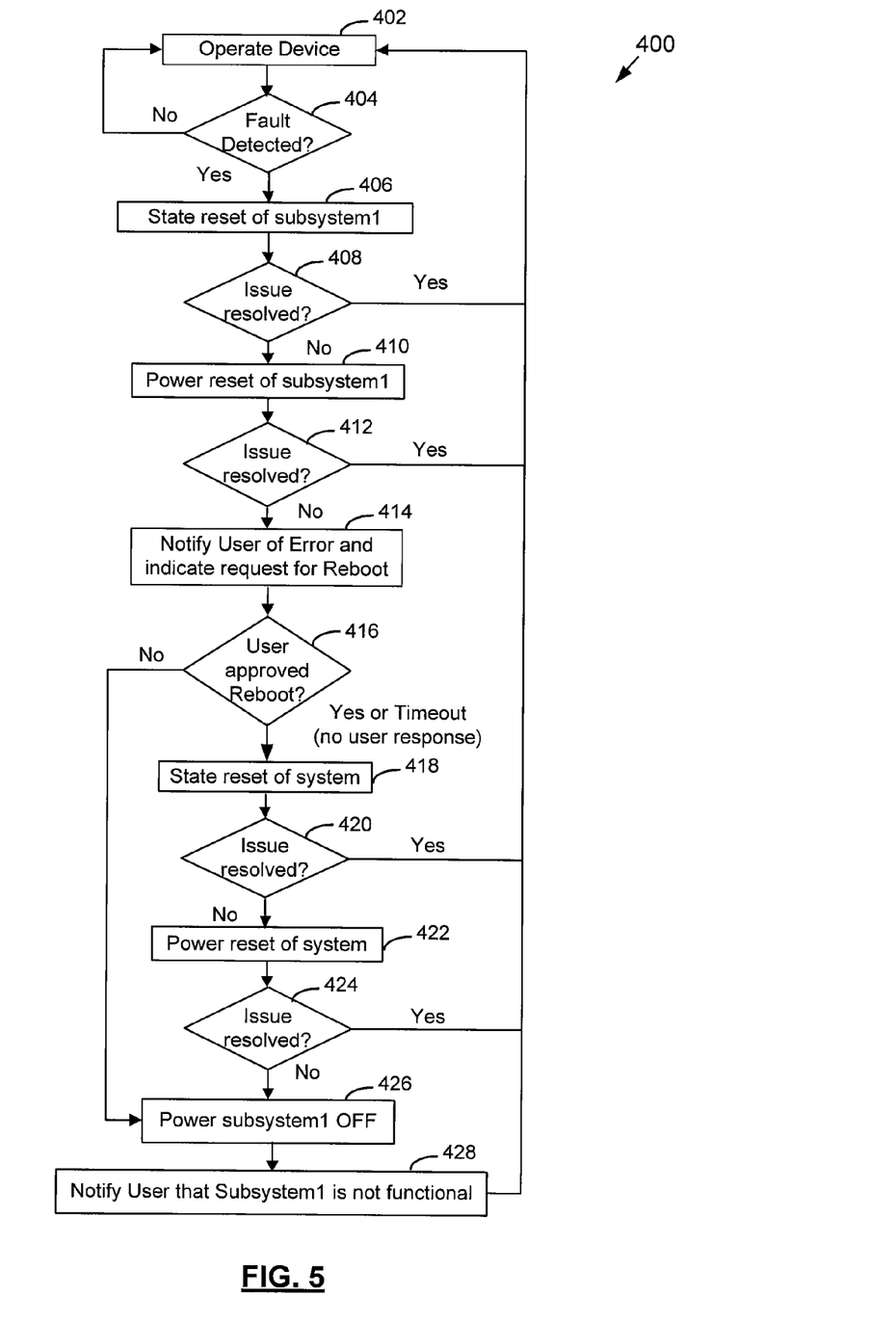
FIG. 5 is a flowchart of an example embodiment of a method for performing selective fault recovery.

Referring now to FIG. 5, shown therein is a flowchart of an example embodiment of a method 400 for performing selective fault recovery.

At 402, the mobile device 100 is operating normally. At 404, the method 400 attempts to detect a fault in a subsystem of the mobile device 100. In general, the fault can be any kind of latch-up error or a thermal fault. A latch-up error is also known as a software fault. An example of a software fault is when a software or firmware program becomes unresponsive (i.e. hangs or freezes) which causes a subsystem to stop working (this does not necessarily mean that the subsystem is overheating). For example, the camera unit 148 can become unresponsive due to a programming error. A thermal fault can be due to any subsystem that has a component that passes a thermal threshold. A thermal fault can be detected by using current measurement or temperature measurement or both current and temperature measurement. These measurements were described previously.

If a fault is detected on a subsystem, such as subsystem1 for example, the subsystem having the detected fault undergoes a state reset at 406. The state reset results in a re-initialization of the subsystem1 so that it returns to its initial state.

If it is determined at 408 that the fault on the subsytem1 is not resolved, then at 410 a power reset is performed for the subsystem1. The power reset involves performing a controlled power down of the various components in the subsystem1 and then re-powering the components in a predetermined sequence. For example, for certain subsystems, such as, but not limited to, the camera subsystem 148, an audio subsystem, or the radio subsystem 104, there could be power down requirements where the power provided to these subsystems needs to be removed in a specific way. These requirements are supplied by the manufacturers of components used in these subsystems and vary from vendor to vendor. Performing a power reset results in a slower recovery of the subsystem1 than the state reset operation of the subsystem1.

If it is determined at 412 that the fault on the subsytem1 is still not resolved, then at 414 the method 400 notifies the user of the device of the fault and provides the user with an option to perform a reset of the mobile device 100 (e.g. a full device reset or system reset). This information and option can be provided in a window that is shown on the display 110 of the mobile device 100. The user may exercise the option, or authorize the reset, in any fashion, such as by entering a tactile command via an auxiliary I/O subsystem 112 or the keyboard 116, or a voice authorization via the microphone 120.

If it is determined at 416 that the user has approved (e.g., authorized or commanded or otherwise initiated) the full device reset, then the method 400 performs a state reset of the system at 418. This state reset operation involves resetting the reset lines to the system and initiating a system reboot. This recovery operation results in a faster recovery time compared to a power reset of the system (which is described below).

If it is determined at 420 that the fault on the subsystem1 is still not resolved, then the method 400 performs a power reset of the system at 422. The power reset of the system involves disconnecting all of the components of the device 100 from the battery unit 130, as well as the external power source 300 if applicable, with the exception of the PMIC 132 where the isolated firmware and microcontroller of the PMIC 132 resides. After a brief delay, the PMIC 132 then provides power to all of the components of the device 100. The power reset of the system results in a slower reboot of the device 100 compared to the state reset of the system.

If it is determined at 416 that the user has not approved of the system reset or if it is determined that the issue is still not resolved at 424 after performing the power reset of the system, then the subsystem having the detected fault is powered down at 426 in order to isolate the subsystem1. The user is then notified that the subsystem1 having the detected fault is not functional at 428. At this point, the user can also be provided with a message to have the mobile device 100 serviced. The message may be provided to the user by, for example, a visual notification on display 110, an audible notification via speaker 118, a tactile notification such as vibration, or any other notification process or combination of processes.

An example of an actual fault recovery is now provided. For purposes of illustration, it may be assumed that the fault affects the camera unit 148. Assume that an electrostatic discharge event occurs on the Voice Coil Motor (VCM) driver (which is basically a pulse width modulated driver) of the camera lens sub-unit 154 and the camera unit 148 fails to autofocus. The fault recovery module 138 (which may for purposes of illustration be embodied as software including instructions executed by the microprocessor 102) recognizes that there is no more acknowledgment from the VCM driver. In other words, the fault recovery module 138 detects a fault of some kind affecting the camera unit 148. The fault recovery module 138 need not detect the cause of the fault, in this example, the electrostatic discharge, but the fault recovery module 138 may determine that the likely source of the fault is in the camera unit 148 (in some circumstances, a fault detected in one subsystem may have a likely source in a different subsystem). In response to the detection of the fault in the camera unit 148, the fault recovery module 138 sends a state reset command to the camera unit 148. Assume that after the state reset command is sent, the fault persists. The fault recovery module 138 determines that the camera lens sub-unit 148 is still being unresponsive and initiates a power reset of the camera unit 148. The fault recovery module 138 re-engages the camera lens sub-unit 148 after the power reset. Assume the fault persists. The fault recovery module 138 determines that the camera lens sub-unit 148 is still being unresponsive. The fault recovery module 138 then informs the user of a fault and requests that the user approve a full device reset. Upon receiving approval from the user, the fault recovery module 138 initiates a state reset of the system. After the device reboots, the fault recovery module 138 then re-engages the camera lens sub-unit 148 and (assuming the fault persists) finds that the camera lens sub-unit 148 is still unresponsive. The fault recovery module 138 then initiates a power reset of the system and, after the device reboots, re-engages the camera lens sub-unit 148 and (assuming the fault persists) finds that the camera lens sub-unit 148 is still unresponsive. At this point the fault recovery module 138 determines that the camera lens sub-unit 148 is damaged beyond recovery. The fault recovery module 138 then powers down the camera unit 148, notifies the user that the camera unit 148 is not operational and advises the user that the camera unit 148 requires repair.

Accordingly, various embodiments are described herein with regards to performing a selective fault recovery for an electronic device having a plurality of subsystems in which one of the subsystems has a fault. The selective fault recovery techniques described herein allow a user to use non-faulty subsystem of the electronic device while selective fault recovery is being conducted on the subsystem having the fault. The selective fault recovery techniques described herein provide a layered approach in which a state reset and a power reset are sequentially performed at the subsystem and system level. Performing the state reset and power reset at the subsystem level allows the user to keep using the mobile device 100 while selective fault recovery is being performed. Furthermore, performing a state reset before a power reset at first the subsystem level and then the system level results in faster recovery since a state reset is quicker than a power reset and it is faster to perform these resets first at the subsystem level than at the system level. Finally, providing the user with the option of performing resets at the system level allows the user to continue to use the device if the user does not wish to use the faulty subsystem.

It should also be noted that at least some of the elements used to perform at least one of the methods of fault recovery described herein that are implemented via software may be written in a high-level procedural language such as object oriented programming. Accordingly, the program code may be written in C, C++ or any other suitable programming language and may comprise modules or classes, as is known to those skilled in object oriented programming. Alternatively, in addition thereto, at least some of these elements implemented via software may be written in assembly language, machine language or firmware as needed. In either case, the program code can be stored on a storage media or on a computer readable medium that is readable by a general or special purpose programmable computing device having a processor, an operating system and the associated hardware and software that is necessary to implement the functionality of at least one of the methods of selecting a communication mode described herein. The program code, when read by a processor, configures the processor to operate in a new, specific and predefined manner in order to perform at least one of the fault recovery methods described herein.

In one aspect, in at least one embodiment described herein, there is provided a method of selective fault recovery during operation of an electronic device. The method comprises detecting a fault in a subsystem of the electronic device; performing a state reset of the subsystem having the detected fault; performing a power reset of the subsystem having the detected fault when the fault persists after performing the state reset of the subsystem having the detected fault; and notifying a user of the electronic device of the fault when the fault persists after performing the power reset of the subsystem having the detected fault and providing the user with an option to perform a reset of the system.

Upon receiving approval for performing the reset of the system, the method comprises performing a state reset of the system; and performing a power reset of the system when the fault persists after performing the state reset of the system.

Alternatively, if approval is not received for performing the reset of the system or the fault persists after performing the power reset of the system, the method comprises powering down the subsystem having the detected fault; and notifying the user that the subsystem having the detected fault is not functional.

Performing the state reset of the subsystem having the detected fault comprises re-initializing the subsystem having the detected fault to return to an initial state.

Performing the power reset of the subsystem having the detected fault comprises performing a controlled power down of various components in the subsystem and then re-powering the components in a predetermined sequence.

In at least some embodiments, detecting the fault comprises measuring a temperature of the subsystem and measuring the current drawn by the subsystem.

In at least some embodiments, the method further comprises using a first processor to perform the state reset of the subsystem and the state reset of the system and using a second processor to perform the power reset of the subsystem and the power reset of the system.

In another aspect, in at least one embodiment described herein, there is provided a computer readable medium comprising a plurality of instructions executable on a microprocessor of an electronic device for adapting the microprocessor to implement a method of selective fault recovery during operation of the electronic device. The method comprises detecting a fault in a subsystem of the electronic device; performing a state reset of the subsystem having the detected fault; performing a power reset of the subsystem having the detected fault when the fault persists after performing the state reset of the subsystem having the detected fault; and notifying a user of the electronic device of the fault when the fault persists after performing the power reset of the subsystem having the detected fault and providing the user with an option to perform a reset of the system.

In another aspect, in at least one embodiment described herein, there is provided an electronic device comprising a plurality of subsystems for providing various functions; sensors coupled to the plurality of subsystems for obtaining measurements used in detecting faults in the subsystems; and at least one processor for performing selective fault recovery during operation of the electronic device. The at least one processor is coupled to the plurality of subsystems via power switches and reset lines, and the at least one processor is configured to detect a fault in one of the subsystems, to perform a state reset of the subsystem having the detected fault, to perform a power reset of the subsystem having the detected fault when the fault persists after performing the state reset of the subsystem having the detected fault, and to notify a user of the electronic device of the fault when the fault persists after performing the power reset of the subsystem having the detected fault and to provide the user with an option to perform a reset of the system.

Upon receiving approval for performing the reset of the system, the at least one processor is further configured to perform a state reset of the system, and then to perform a power reset of the system when the fault persists after performing the state reset of the system.

Alternatively, if approval is not received for performing the reset of the system or the fault persists after performing the power reset of the system, the at least one processor is further configured to power down the subsystem having the detected fault, and to notify the user that the subsystem having the detected fault is not functional.

In at least some embodiments, the sensors comprise temperature sensors and current sensors associated with each of the plurality of subsystems and detecting the fault comprises measuring temperature and current drawn by the subsystems.

In at least some embodiments, the device comprises first and second processors, the first processor being configured to perform the state reset of the subsystem having the detected fault and the state reset of the system and the second processor being configured to perform the power reset of the subsystem having the detected fault and the power reset of the system.

In at least some embodiments, the first processor is coupled to the subsystems with the reset lines and the second processor is coupled to the subsystems with the reset lines and the power switches.

It should be understood that various modifications can be made to the embodiments described and illustrated herein, without departing from the embodiments, the general scope of which is defined in the appended claims.

The invention claimed is:

1. A method of selective fault recovery during operation of an electronic device, wherein the method comprises:
   detecting a fault in a subsystem of the electronic device;
   performing a state reset of the subsystem having the detected fault;
   performing a power reset of the subsystem having the detected fault when the fault persists after performing the state reset of the subsystem having the detected fault;
   notifying a user of the electronic device of the fault when the fault persists after performing the power reset of the subsystem having the detected fault and providing the user with an option to perform a reset of the system;

performing a state reset of the system upon receiving approval for performing the reset of the system;

performing a power reset of the system when the fault persists after performing the state reset of the system;

wherein if approval is not received for performing the reset of the system or the fault persists after performing the power reset of the system, the method further comprises:

powering down the subsystem having the detected fault; and notifying the user that the subsystem having the detected fault is not functional.

2. The method of claim 1, wherein performing the state reset of the subsystem having the detected fault comprises re-initializing components in the subsystem having the detected fault to return to an initial state.

3. The method of claim 1, wherein performing the power reset of the subsystem having the detected fault comprises performing a controlled power down of various components in the subsystem and then re-powering the components in a predetermined sequence.

4. The method of claim 1, wherein detecting the fault comprises measuring a temperature of the subsystem and measuring the current drawn by the subsystem.

5. The method of claim 1, further comprising using a first processor to perform the state reset of the subsystem and the state reset of the system and using a second processor to perform the power reset of the subsystem and the power reset of the system.

6. A non-transitory computer readable medium comprising a plurality of instructions executable on a microprocessor of an electronic device for adapting the microprocessor to implement a method of selective fault recovery during operation of the electronic device, wherein the method comprises:

detecting a fault in a subsystem of the electronic device;

performing a state reset of the subsystem having the detected fault;

performing a power reset of the subsystem having the detected fault when the fault persists after performing the state reset of the subsystem having the detected fault;

notifying a user of the electronic device of the fault when the fault persists after performing the power reset of the subsystem having the detected fault and providing the user with an option to perform a reset of the system;

performing a state reset of the system upon receiving approval for performing the reset of the system;

performing a power reset of the system when the fault persists after performing the state reset of the system;

wherein if approval is not received for performing the reset of the system or the fault persists after performing the power reset of the system, the method further comprises:

powering down the subsystem having the detected fault; and notifying the user that the subsystem having the detected fault is not functional.

7. The non-transitory computer readable medium of claim 6, wherein performing the state reset of the subsystem having the detected fault comprises re-initializing components in the subsystem having the detected fault to return to an initial state.

8. The non-transitory computer readable medium of claim 6, wherein performing the power reset of the subsystem having the detected fault comprises performing a controlled power down of various components in the subsystem and then re-powering the components in a predetermined sequence.

9. The computer readable medium of claim 6, wherein detecting the fault comprises measuring a temperature of the subsystem and measuring the current drawn by the subsystem.

10. An electronic device comprising:

a plurality of subsystems for providing various functions;

sensors coupled to the plurality of subsystems for obtaining measurements used in detecting faults in the subsystems; and at least one processor for performing selective fault recovery during operation of the electronic device, the at least one processor being coupled to the plurality of subsystems via power switches and reset lines, and the at least one processor being configured to detect a fault in one of the subsystems, to perform a state reset of the subsystem having the detected fault, to perform a power reset of the subsystem having the detected fault when the fault persists after performing the state reset of the subsystem having the detected fault, to notify a user of the electronic device of the fault when the fault persists after performing the power reset of the subsystem having the detected fault and to provide the user with an option to perform a reset of the system, to perform a state reset of the system upon receiving approval for performing the reset of the system, and then to perform a power reset of the system when the fault persists after performing the state reset of the system, wherein if approval is not received for performing the reset of the system or the fault persists after performing the power reset of the system, the at least one processor is further configured to power down the subsystem having the detected fault, and to notify the user that the subsystem having the detected fault is not functional.

11. The electronic device of claim 10, wherein the state reset of the subsystem having the detected fault comprises re-initializing components in the subsystem having the detected fault to return to an initial state.

12. The electronic device of claim 10, wherein the power reset of the subsystem having the detected fault comprises performing a controlled power down of various components in the subsystem and then re-powering the components in a predetermined sequence.

13. The electronic device of claim 10, wherein the sensors comprise temperature sensors and current sensors associated with each of the plurality of subsystems and detecting the fault comprises measuring temperature and current drawn by the subsystems.

14. The electronic device of claim 10, wherein the device comprises first and second processors, the first processor being configured to perform the state reset of the subsystem having the detected fault and the state reset of the system and the second processor being configured to perform the power reset of the subsystem having the detected fault and the power reset of the system.

15. The electronic device of claim 14, wherein the first processor is coupled to the subsystems with the reset lines and the second processor is coupled to the subsystems with the reset lines and the power switches.

* * * * *